United States Patent
Kaneda et al.

(10) Patent No.: US 9,036,999 B2
(45) Date of Patent: May 19, 2015

(54) FRAME/SYMBOL SYNCHRONIZATION IN COHERENT OPTICAL OFDM

(75) Inventors: Noriaki Kaneda, Westfield, NJ (US); Timo Pfau, Westfield, NJ (US); Qi Yang, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 732 days.

(21) Appl. No.: 13/194,347

(22) Filed: Jul. 29, 2011

(65) Prior Publication Data

US 2012/0027419 A1 Feb. 2, 2012

Related U.S. Application Data

(60) Provisional application No. 61/369,666, filed on Jul. 31, 2010.

(51) Int. Cl.

| | |
|---|---|
| H04B 10/00 | (2013.01) |
| H04L 27/06 | (2006.01) |
| H04L 27/00 | (2006.01) |
| H04K 1/10 | (2006.01) |
| H04L 27/22 | (2006.01) |
| H04B 10/516 | (2013.01) |
| H04B 10/60 | (2013.01) |
| H04L 27/26 | (2006.01) |

(52) U.S. Cl.
CPC ............ *H04L 27/223* (2013.01); *H04B 10/516* (2013.01); *H04B 10/60* (2013.01); *H04L 27/2657* (2013.01); *H04L 27/2663* (2013.01); *H04L 27/2671* (2013.01); *H04L 27/2675* (2013.01); *H04L 27/2684* (2013.01); *H04L 27/2692* (2013.01)

(58) Field of Classification Search
USPC .......................... 398/158, 208, 182, 140, 202
See application file for complete search history.

(56) References Cited

U.S. PATENT DOCUMENTS

| | | | | |
|---|---|---|---|---|
| 5,768,323 | A * | 6/1998 | Kroeger et al. ............... | 375/355 |
| 6,928,046 | B1 * | 8/2005 | Sajadieh et al. .............. | 370/203 |
| 8,463,133 | B1 * | 6/2013 | Roberts ......................... | 398/154 |
| 2003/0072254 | A1 * | 4/2003 | Ma et al. ...................... | 370/208 |
| 2004/0141457 | A1 * | 7/2004 | Seo et al. ...................... | 370/203 |
| 2005/0185743 | A1 * | 8/2005 | Li .................................. | 375/350 |
| 2005/0210157 | A1 * | 9/2005 | Sakoda ......................... | 709/251 |
| 2006/0050624 | A1 * | 3/2006 | Akita ............................. | 370/208 |

(Continued)

OTHER PUBLICATIONS

Moose, Paul H., "A Technique for Orthogonal Frequency Division Multiplexing Frequency Offset Correction," IEEE Transaction on Communications, Oct. 1994, pp. 2908-2914, vol. 42, No. 16.

(Continued)

*Primary Examiner* — Oommen Jacob
(74) *Attorney, Agent, or Firm* — Hitt Gaines, PC

(57) ABSTRACT

One aspect provides an optical communication system. The system includes an optical-to-digital converter, a frequency estimator and a symbol synchronizer. The optical-to-digital converter is configured to receive an optical OFDM bit stream including an OFDM symbol bearing payload data and a symbol header preceding the OFDM payload data. The frequency estimator is configured to determine a carrier frequency offset of the payload data from the symbol header. The symbol synchronizer is configured to determine a starting location of the payload data within the bit stream by cross-correlating a synchronization pattern within the symbol header with a model synchronization pattern stored by the symbol synchronizer.

18 Claims, 10 Drawing Sheets

(56) References Cited

U.S. PATENT DOCUMENTS

| | | | |
|---|---|---|---|
| 2006/0050625 A1* | 3/2006 | Krasner | 370/208 |
| 2006/0239370 A1* | 10/2006 | Mody et al. | 375/260 |
| 2006/0250940 A1* | 11/2006 | Tirkkonen et al. | 370/208 |
| 2006/0256321 A1* | 11/2006 | Dolne et al. | 356/121 |
| 2006/0268671 A1* | 11/2006 | Coon | 370/203 |
| 2007/0086328 A1* | 4/2007 | Kao et al. | 370/208 |
| 2007/0217524 A1* | 9/2007 | Wang et al. | 375/260 |
| 2007/0230591 A1* | 10/2007 | Choi et al. | 375/260 |
| 2008/0159758 A1* | 7/2008 | Shpantzer et al. | 398/214 |
| 2008/0311845 A1* | 12/2008 | Scarpa et al. | 455/3.02 |
| 2009/0213947 A1* | 8/2009 | Rao et al. | 375/260 |
| 2009/0297144 A1* | 12/2009 | Djordevic et al. | 398/39 |
| 2009/0324223 A1* | 12/2009 | Liu | 398/65 |
| 2009/0324226 A1* | 12/2009 | Buchali et al. | 398/76 |
| 2010/0021163 A1* | 1/2010 | Shieh | 398/65 |
| 2010/0061403 A1* | 3/2010 | Mueller | 370/474 |
| 2010/0208832 A1* | 8/2010 | Lee et al. | 375/260 |
| 2010/0303179 A1* | 12/2010 | Inagawa et al. | 375/343 |
| 2010/0329683 A1* | 12/2010 | Liu | 398/81 |
| 2011/0075764 A1* | 3/2011 | Fan et al. | 375/316 |
| 2011/0090992 A1* | 4/2011 | Chung et al. | 375/340 |
| 2011/0200058 A1* | 8/2011 | Mushkin et al. | 370/475 |
| 2012/0141138 A1* | 6/2012 | Yang et al. | 398/158 |

OTHER PUBLICATIONS

Buchali, Fred et al., "Optical OFDM—A Promising High-Speed Optical Transport Technology," Bell Labs Technical Journal, pp. 1-20.

Schmidl, Timothy M., et al., Robust Frequency and Timing Synchronization for OFDM, IEEE Transactions on Communications, Dec. 1997, pp. 1613-1621, vol. 45, No. 12.

Shieh, W., et al., Coherent optical OFDM: theory and design, Optics Express, Jan. 21, 2008, pp. 841-859, vol. 16, No. 2.

Yang, Qi, et al., Real-Time Coherent Optical OFDM Receiver at 2.5-GS/s for Receiving a 54-Gb/s Multi-band Signal, 2009 IEEE, 3 pages, OSA/OFC/NFOEC 2009.

Kaneda, Noriaki, et al., Real-Time 2.5 GG/s Coherent Optical Receiver for 53.3-Gb/s Sub-Banded OFDM, Journal of Lightwave Technology, Feb. 15, 2010, pp. 494-501, vol. 28, No. 4, IEEE.

* cited by examiner

FRAME/SYMBOL SYNCHRONIZATION IN COHERENT OPTICAL OFDM

CROSS REFERENCE RELATED APPLICATION

This application claims the benefit of provisional application Ser. No. 61/369,666 to Kaneda, et al. filed Jul. 31, 2010 and titled "Frame/Synchronization Technique in Parallel Processing", commonly assigned with the present invention and incorporated herein by reference.

TECHNICAL FIELD

This application relates to optical transmission systems, and, in particular, to systems, apparatus and techniques for symbol synchronization.

BACKGROUND

Optical frequency-division multiplexing (OFDM) has been used for wireless transmission systems, and more recently for optical transmission systems. OFDM typically relies on training sequences in the data stream for frame/symbol synchronization. Correlation of the training sequences at high data transmission rates envisioned for optical systems places high computational demands on signal processing devices used to decode the OFDM signal.

SUMMARY

One aspect provides an optical communication system. The system includes an optical-to-digital converter, a frequency estimator and a symbol synchronizer. The optical-to-digital converter is configured to receive an optical OFDM bit stream including an OFDM symbol bearing payload data and a symbol header preceding the OFDM payload data. The frequency estimator is configured to determine a carrier frequency offset of the payload data from the symbol header. The symbol synchronizer is configured to determine a starting location of the payload data within the bit stream by cross-correlating a synchronization pattern within the symbol header with a model synchronization pattern stored by the symbol synchronizer.

Another aspect provides an optical communication system. The system includes an optical transmitter and an optical receiver. The optical transmitter is configured to transmit an optical OFDM bit stream. The bit stream includes an OFDM symbol bearing payload data and a symbol header preceding the OFDM payload data. The symbol header includes at least two training patterns. Each training pattern has a length that is an integer multiple of a number of parallel channels in the OFDM payload data.

Another aspect provides a method. The method includes the steps of configuring an optical-to-digital converter, configuring a frequency estimator, and configuring a symbol synchronizer. The optical-to-digital converter is configured to receive an optical OFDM bit stream including an OFDM symbol bearing payload data and a symbol header preceding the OFDM payload data. The frequency estimator is configured to determine a carrier frequency offset of the payload data from the symbol header. The symbol synchronizer is configured to determine a starting location of the payload data within the bit stream by cross-correlating a synchronization pattern with a model synchronization pattern stored by the symbol synchronizer.

Yet another aspect provides an optical orthogonal frequency-division multiplexing (OFDM) receiver subsystem. The subsystem includes an optical-to-digital converter module, first and second frequency estimation modules, and first and second symbol synchronizer modules. The optical-to-digital converter module is configured to receive an optical OFDM bit stream. The first frequency estimator and the first symbol synchronizer are implemented on a first programmable logic device and configured to determine a carrier frequency offset of an orthogonal frequency-division multiplexed frame associated with a first polarization channel of the OFDM bit stream. The second frequency estimator and the second symbol synchronizer are implemented on a second programmable logic device and configured to determine a carrier frequency offset of an orthogonal frequency-division multiplexed frame associated with a second polarization channel of the OFDM bit stream. The first and second programmable logic devices are configured to operate on a OFDM bit stream having a bit rate of at least about 100 Gb/s.

BRIEF DESCRIPTION

Reference is now made to the following descriptions taken in conjunction with the accompanying drawings, in which.

DETAILED DESCRIPTION

Figure 1:
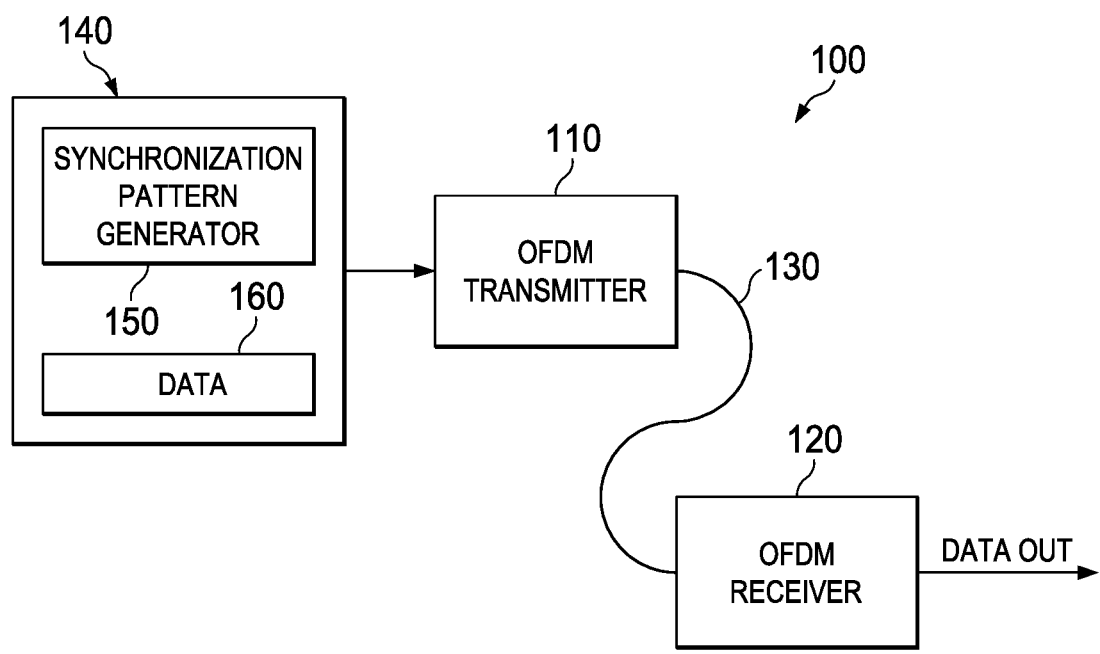
FIG. 1 illustrates a system according to one embodiment, e.g. an optical communication system, including an OFDM transmitter and an OFDM receiver.

An OFDM transmitter typically transmits a succession of data frames to an OFDM receiver. Each data frame typically includes a symbol header and a data block. The header block typically includes a time-domain-modulated bit sequence used for synchronization and frequency estimation. The header block may include, e.g. a training sequence that is used for frame and symbol synchronization and frequency offset estimation. The training sequence typically includes two identical patterns.

The conventional receiver may implement a sliding window autocorrelation function such as described by Eq. 1 to detect the beginning of the data block, $$P(d) = \sum_{k=0}^{L-1} r^*(d+k)r(d+k+L) \quad (1)$$

where r is a received synchronization pattern, r* is the complex conjugate of the specified r value, L is the length of the synchronization pattern, k is an index signifying the position within the synchronization pattern, and d is an index signifying a beginning of the synchronization window. The data block typically includes data multiplexed onto multiple OFDM data channels in a frequency-division multiplexed format and converted to a serial bit stream via an inverse fast Fourier transform (FFT).

A conventional OFDM receiver typically processes the received serial bit stream to perform autocorrelation of the two identical patterns to determine the beginning of the OFDM frame and symbol, and to determine a carrier offset frequency. Such an approach may be implemented on readily available electronic devices in a low bit rate transmission system, such as a wireless radio frequency (RF) communications system.

However, for optical communication systems, where transmission rates may exceed 100 Gb/s, it may be desirable to use multiple parallel data paths to reduce the data rate within a digital integrated circuit decoder, thereby reducing the demands on receiver signal processing circuits. However, potential alternative methods that perform autocorrelation by parallel processing of multiple bit streams may not be feasible or desirable in some system designs due to, e.g. circuit complexity that scales with the number of parallel OFDM data channels.

The inventors provide herein in some embodiments and techniques for autocorrelation in an optical OFDM receiver that use parallel data paths to reduce data rates in critical paths of the receiver. The parallel implementation may result, e.g. in a more hardware-efficient implementation. For example, in various embodiments one or more programmable logic devices are used to implement parallel data paths that each employ the streamlined autocorrelation. Frame synchronization and frequency estimation may be based on autocorrelation, but in some embodiments may be modified to achieve a more hardware efficient implementation in parallel processing.

Some embodiments provide systems and methods for improved estimation of carrier frequency and symbol synchronization. Some such embodiments include first auto-correlating carrier frequency estimation (CFE) training patterns, followed by cross-correlating a symbol synchronization pattern with a model pattern locally stored by the OFDM receiver. These embodiments may provide significant reduction of hardware needed for OFDM signal detection and decoding.

Various example embodiments will now be described more fully with reference to the accompanying figures, it being noted that specific structural and functional details disclosed herein are representative for purposes of describing example embodiments. Embodiments within the scope of the disclosure may be rendered in alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. As used herein, the term "and" is used in both the conjunctive and disjunctive sense and includes any and all combinations of one or more of the associated listed items. The singular forms "a", "an" and "the" are intended to include the plural forms as well, unless the context clearly indicates otherwise. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Functions described with respect to the illustrative methods may be readily carried out by special or general purpose digital information processing devices that implement a digital signal processor (DSP) acting under appropriate instructions embodied, e.g., in software, firmware, or hardware programming. For example, functional modules of the DSP and the other logic circuits can be implemented as a programmable logic device such as an ASIC (Application Specific Integrated Circuit) constructed with semiconductor technology and/or an FPGA (Field Programmable Gate Arrays) and/or any other hardware blocks.

Turning to FIG. 1, an optical communication system 100 is illustrated according to one embodiment of the disclosure. The system 100 includes a transmitter subsystem 110, a receiver subsystem 120 and an optical path 130 therebetween. The subsystems 110 and 120 may be configured, e.g. to respectively transmit and receive payload data using an OFDM protocol via the optical path 130, e.g. a fiber-optical cable.

A bit-sequence generator 140 is configured to provide a sequence of bits to the transmitter subsystem 110 for transmission over the optical path 130. Data may be transmitted via orthogonal polarization modes of the optical path 130, e.g. horizontal (H) and vertical (V) modes. As described further below the bit-sequence generator 140 includes a synchronization pattern generator 150 and a data source 160. The bit-sequence generator 140 provides to the transmitter subsystem 110 a data stream that is a composite of the data from the synchronization pattern generator 150 and the data source 160. For example, a bit-sequence may be compatible with any applicable present or future OFDM standards, including a symbol header generated by the synchronization pattern generator 150 that includes a training sequence, and symbol data from the data source 160.

Figure 2:
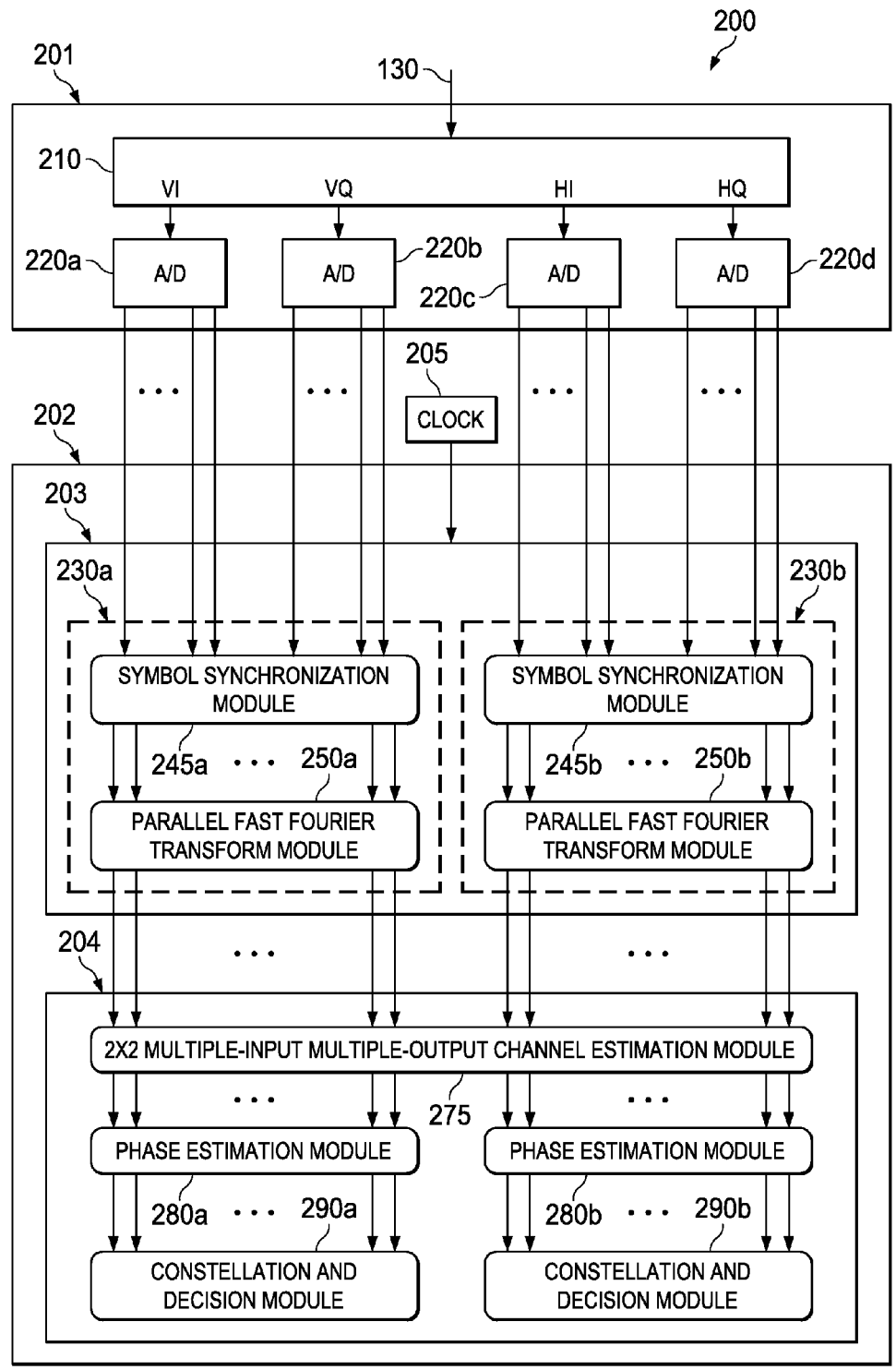
FIG. 2 illustrates a functional block diagram of the OFDM receiver of FIG. 1 according to a first embodiment.

FIG. 2 illustrates a receiver subsystem 200 that may be used as the receiver subsystem 120 in one embodiment. The receiver subsystem 200 includes an optical-to-digital converter (ODC) 201 and a DSP 202. The DSP 202 includes a front-end sub-processor 203 and a multiple-input multiple-output (MIMO) demodulation sub-processor 204. A system clock 205 provides a clock signal to the DSP 202 for synchronization of operations performed thereby.

The ODC 201 includes an optical receiver 210 that demodulates the optical signal received from the optical path 130. The optical signal may include H and V polarization channels, each of which may be independently modulated, e.g. by QPSK. The optical receiver 210 produces I and Q outputs for each of the H and V polarization channels, e.g. VI, VQ, HI and HQ. In one embodiment the received optical signal is polarization modulated and QPSK modulated. Analog-to-digital converters (ADCs) 220a-d respectively convert the VI, VQ, HI and HQ signals to digital data, e.g. 64-bit data words corresponding to sampled values of the VI, VQ, HI and HQ signals.

The front-end sub-processor 203 includes two parallel data paths 230a, 230b. The first data path 230a includes a symbol synchronization module 245a and a parallel FFT module 250a. The second data path 230b includes a symbol synchronization module 245b and a parallel FFT module 250b. The demodulation subprocessor 204 receives the output from the data paths 230a, 230b and may perform MIMO decoding of the received data. The operation of the data paths 230a, 230b may be nominally identical, so the following description of the first data path 230a operation can be applied to the second data path 230b with necessary changes.

The demodulation subprocessor 204 includes a channel estimation module 275, phase estimation modules 280a, 280b and constellation and decision modules 290a and 290b. The operation of the demodulation subprocessor 204 is understood by those skilled in the pertinent art and may be conventional. In brief summary, the channel estimation module 275 receives OFDM channel outputs from the parallel FFT modules 250a, 250b. The phase estimation modules 280a, 280b estimate the phase offset of the received symbols to the OFDM constellation and compensate the phase symbol-by-symbol. The decision modules 290a, 290b receive the phase estimation values and determine the constellation points of received symbols. Thus the modules 275, 280a, 280b, 290a and 290b operate to recover the encoded data from the converted output of the FFT modules 250a, 250b.

Figure 3:
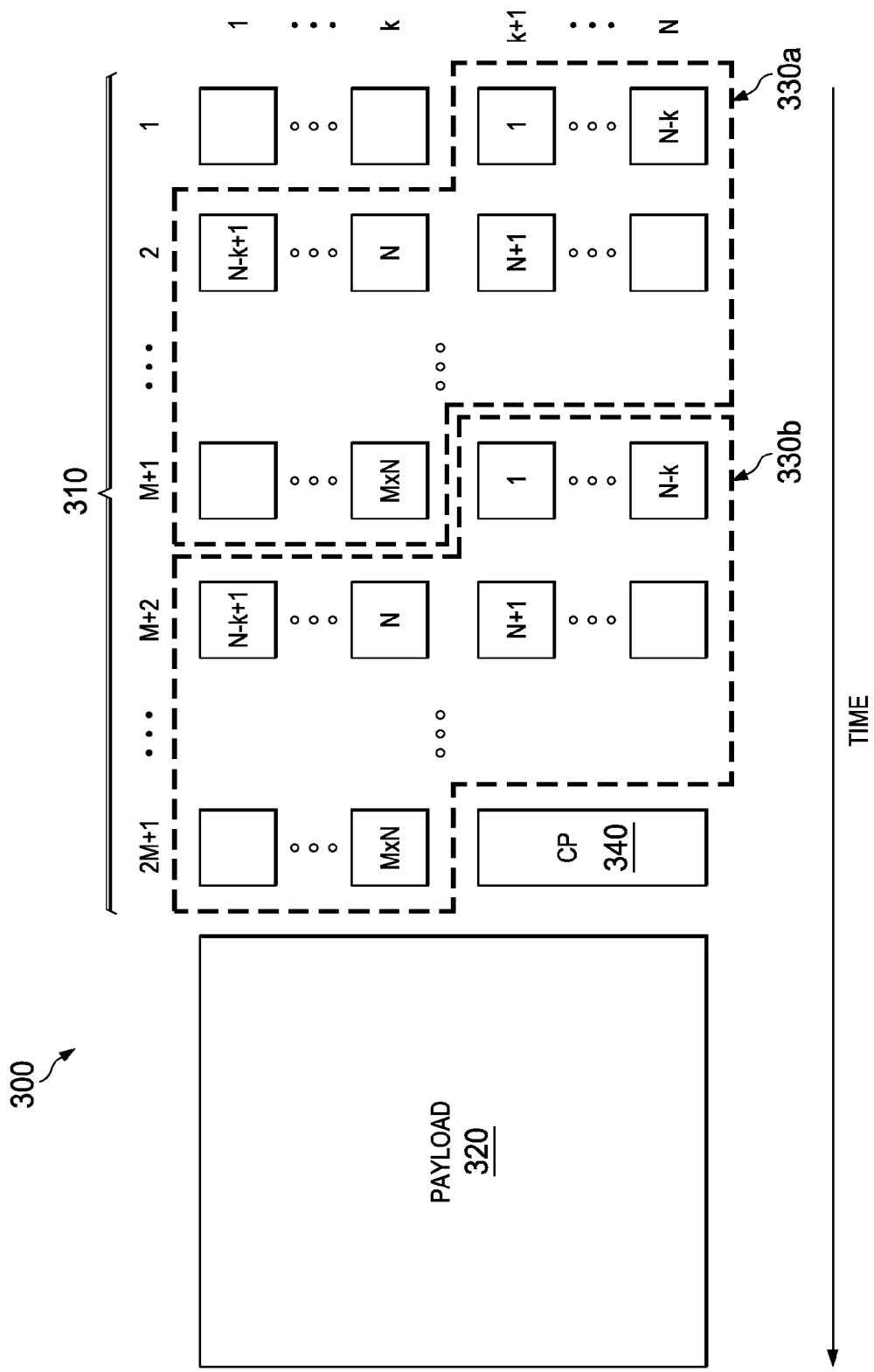
FIG. 3 illustrates an OFDM symbol and a symbol header configured according to one embodiment, in which the symbol header includes two repeated patterns each having a length that is an integer multiple of a number OFDM data of channels transmitted by the OFDM symbol.

FIG. 3 illustrates a received OFDM frame 300 according to one embodiment. Time is represented as advancing from right to left in the view of the figure. The frame 300 includes a frame header 310 and data payload 320. The frame header 310 may be formatted by the synchronization pattern generator 150, and the data payload 320 may be formatted by the data source 160 prior to transmission by the transmitter subsystem 110. In some embodiments the received data payload 320 is OFDM formatted and includes OFDM symbols. The frame header 310 is organized as columns numbered 1 to 2M+1 and rows from 1 to N. The symbol synchronization module 245a operates to synchronize to the received bit stream and to determine the beginning of the data payload 320.

The frame header 310 includes first and second identical training patterns 330a, 330b and a cyclic prefix (CP) 340. The training pattern 330a begins at the first column, k+1$^{st}$ row of the frame header 310. The training pattern 330a includes M instances of a sub-pattern of length N. Following k lead words of arbitrary value, a first word of the training pattern 330a occurs at the k+1$^{st}$ position in the first column. The last word of the first column is word N−k of the first sub-pattern. Word N−k+1 falls at the first position of the second column. The first sub-pattern ends at the k$^{th}$ position of the second column, and the second instance of the sub-pattern begins at position k+1. Sub-patterns of the first training pattern 330a continue to fill columns of the frame header 310 until reaching the M*N$^{th}$ word at the k$^{th}$ position on the M+1$^{st}$ column.

The second training pattern 330b begins at the k+1$^{st}$ position of the M+1$^{st}$ column, and continues to the k$^{th}$ position of the 2M+1$^{st}$ column. The training pattern 330b is identical to the training pattern 330a in various embodiments, and also includes M instances of a sub-pattern of length N.

The CP 340 begins at the k+1$^{st}$ position of the 2*M+1$^{st}$ column and ends at the N$^{th}$ position of the same column. The synchronization process performed by the symbol synchronization module 245a includes autocorrelation of the training patterns 330a, 330b to determine the starting point of the data payload 320. As used herein and in the claims, autocorrelation means cross-correlation of at least a first portion of the frame header 310 with at least a second portion of the frame header 310. More specifically, in various embodiments autocorrelation includes cross-correlation of a first training pattern, e.g. the training pattern 330a, with a second training pattern, e.g. the training pattern 330b. In another aspect the term "autocorrelation" denotes that in some embodiments the training patterns 330a and 330b are identical.

The number M of sub-patterns in each training pattern 330a, 330b is not limited to a particular value. In some embodiments M is at least 1 and is not otherwise limited to any particular value. However, as M increases the training patterns impose a larger overhead burden, thereby reducing the useful data rate.

In various embodiments the synchronization pattern generator 150 forms the training patterns 330a, 330b such that each has a length L that is an integer multiple M of the number of parallel channels N, i.e. L=M×N. The inventors have recognized that when the sub-patterns are organized in this manner the correlation between the two training patterns 330a, 330b may be performed in a simplified block computation using significantly fewer computational resources. In some embodiments the training patterns 330a and 330b are repeated to obtain multiple autocorrelations, which are then averaged to reduce noise in the frequency estimation.

Accordingly, when the training patterns 330a, 330b are thusly constrained an autocorrelation function may be implemented as described by Eq. 2, in which the autocorrelation terms are grouped for efficient computation. Equation 2 represents an autocorrelation model suitable for OFDM and other data formats.

$$P(d) = \sum_{i=0}^{M} \sum_{m=Ni}^{N(i+1)-1} (r^*(d+m) \cdot r(d+m+L)) \quad (2)$$

Figure 4:
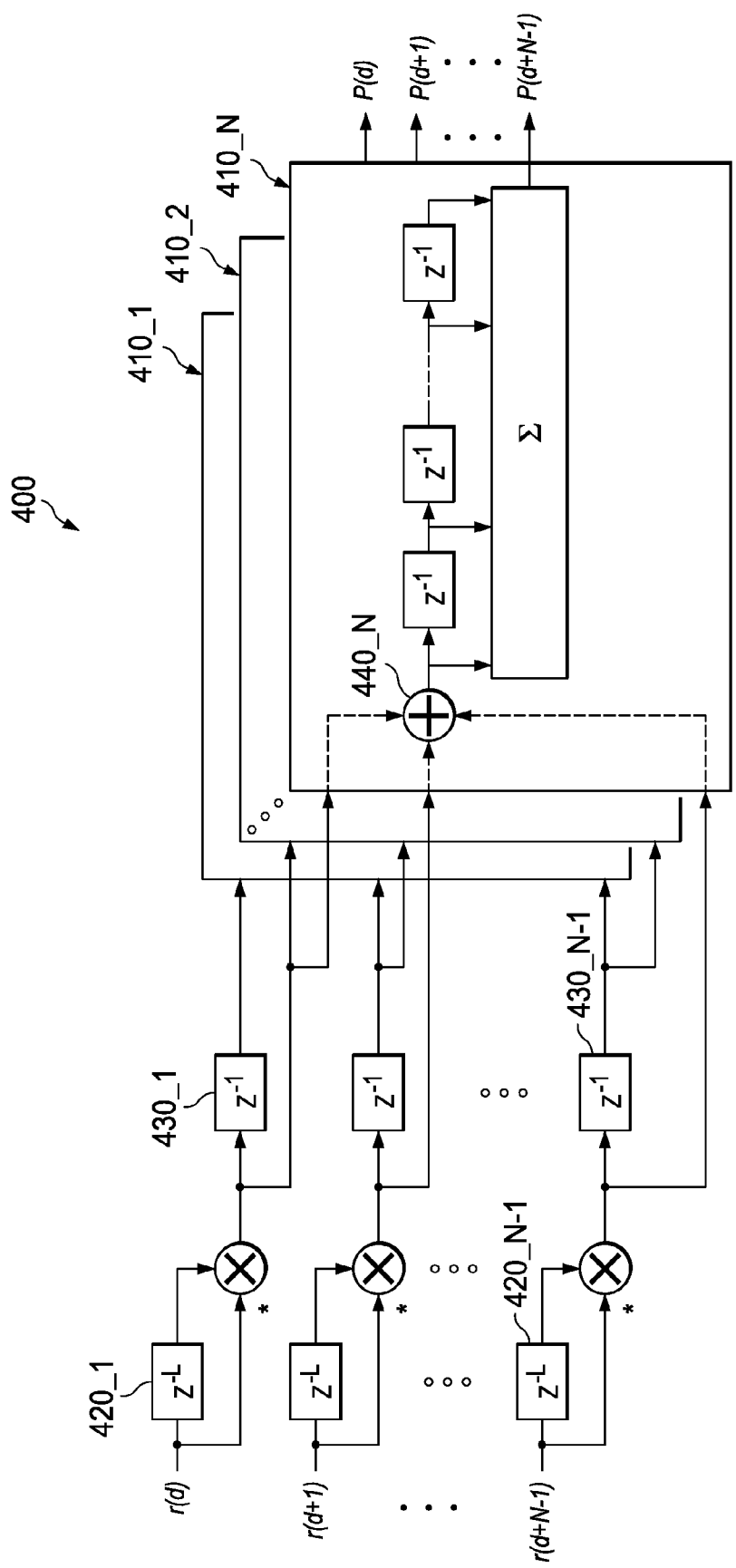
FIG. 4 illustrates an implementation of a methodology to determine an autocorrelation value using a correlation channel for each OFDM data channel of the received OFDM symbol.

FIG. 4 illustrates a computational model 400 that implements Eq. 2. The model 400 includes N parallel computational channels 410_1, 410_2, ... 410_N. The channels 410 each receive an N-bit subpattern r(d), r(d+1), ... r(d+N−1) of a received training pattern, e.g. one of the training patterns 330. Each parallel channel 410 includes an autocorrelation term 420, e.g. term 420_1, with L delayed samples. The autocorrelation term is delayed by one clock cycle by term 430_1, before a summation term 440_1. After the delay the parallel autocorrelation terms are taken to obtain N-long autocorrelation. Cascaded delays are taken for an N-long autocorrelation before they are summed to form an L-long autocorrelation.

A carrier frequency offset (CFO) (Δf) may be computed as a function of the autocorrelation value P(d), e.g. via Eq. 3:

$$\Delta f = \frac{\angle P(d) \times S_{sampling}}{2\pi \times L} \quad (3)$$

where L is the length of the synchronization pattern and $S_{sampling}$ is the sampling rate of the ADCs 220*a*-*d*.

Figure 7:
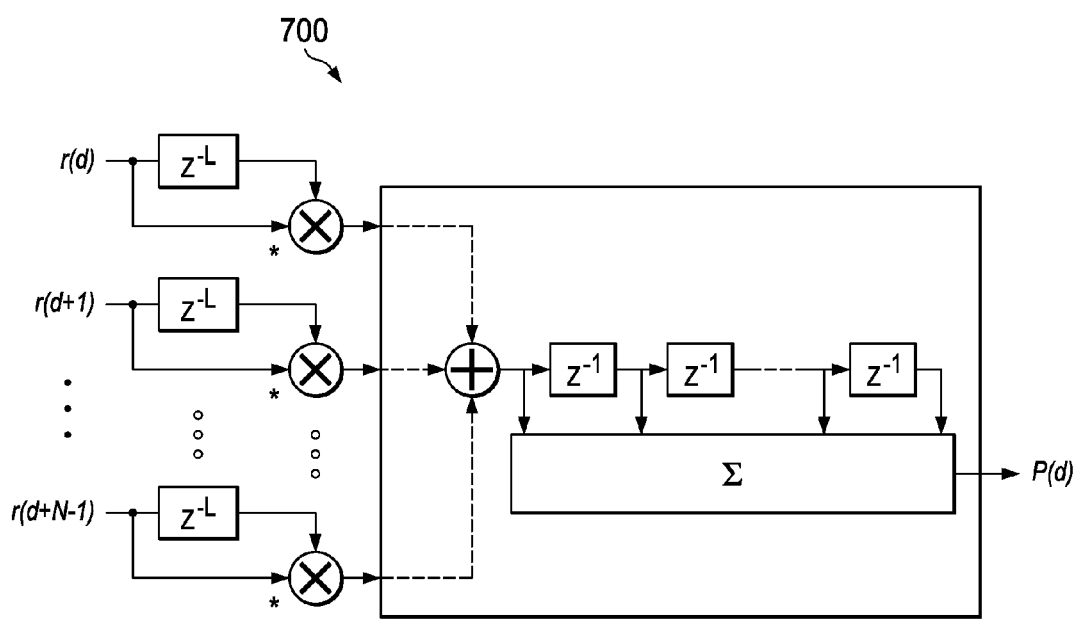
FIG. 7 illustrates a computational model that may be used by the receiver of FIG. 5 to determine a carrier frequency offset.

The model of Eq. 2 may be further simplified for OFDM formatted data frames. Referring to FIG. 3, the CP 340 may be used to avoid inter-symbol interference. Therefore the OFDM symbol can start from any sample within the CP 340. In this case only a single computational channel is needed, e.g. the computational channel 410_1 of FIG. 4, thereby reducing the number of complex adders by (N−1)/N. FIG. 7, described below, illustrates one embodiment of a methodology based on this principle.

Because the CP 340 can absorb arbitrariness of d, the beginning of the data payload 320 can be successfully determined with reduced computational resources. Typically in this embodiment it is preferred that the CP not be used to absorb other intersymbol interference to preserve the integrity of the autocorrelation signal.

In contrast to, e.g. some down-sampled autocorrelation functions, Eq. 2 and the model 400 provide the L-long autocorrelation taken for each sample and its amplitude gives rise to the peak at $k^{th}$ autocorrelation in the $i^{th}$ clock cycle.

Figure 5:
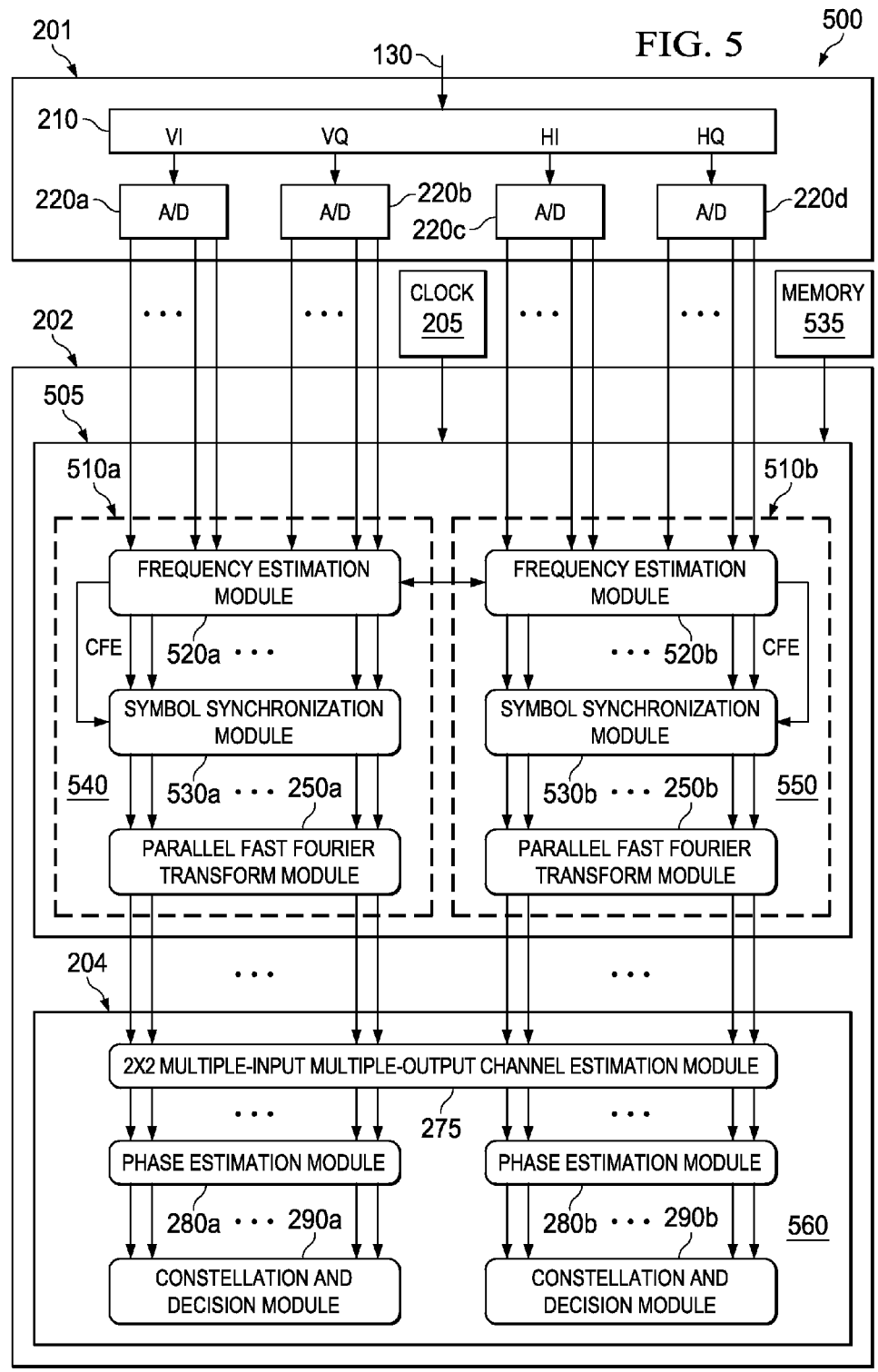
FIG. 5 illustrates a functional block diagram of the OFDM receiver of FIG. 1 according to a second embodiment in which a carrier frequency offset is determined before symbol synchronization.

Turning now to FIG. 5, a receiver subsystem 500 is illustrated that may be used as the receiver subsystem 120 in another embodiment. The receiver subsystem 500 is configured to improve carrier frequency offset tolerance while simultaneously providing hardware-efficient symbol synchronization. Where the subsystem 500 shares components with the receiver subsystem 200, like components are identically referenced.

The receiver subsystem 500 includes a front-end sub-processor 505. The front-end sub-processor 505 includes parallel first and second data paths 510*a*, 510*b*. The first data path 510*a* includes a frequency estimation module 520*a*, symbol synchronization module 530*a* and the parallel FFT module 250*a*. The second data path 510*b* includes a frequency estimation module 520*b*, a symbol synchronization module 530*b*, and a parallel FFT module 250*b*. The operation of the data paths 510*a*, 510*b* may be nominally identical, so the following description of the first data path 510*a* operation may be applied to the second data path 510*b* with necessary changes.

Figure 6:
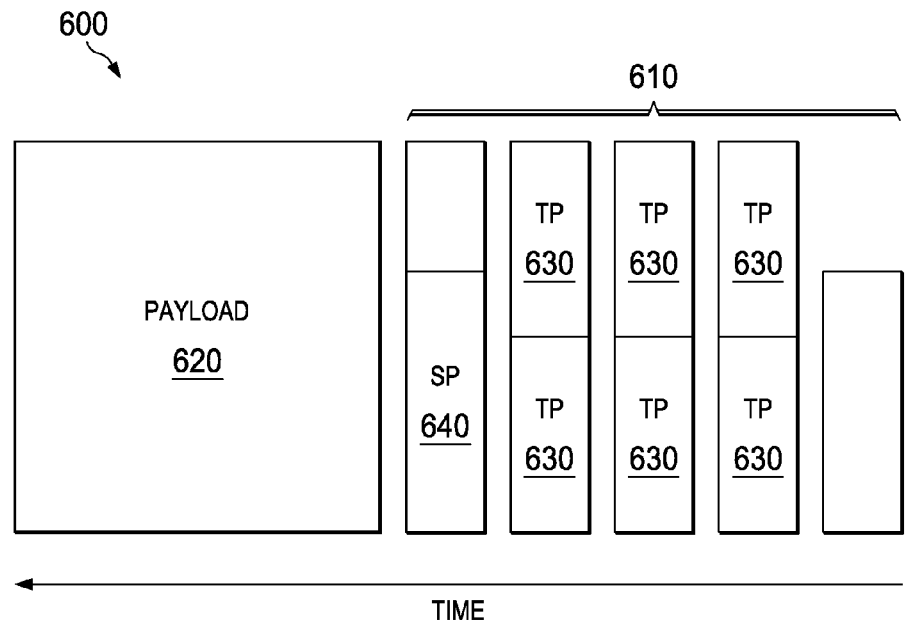
FIG. 6 illustrates an OFDM symbol and a symbol header suitable for use by the receiver of FIG. 5, wherein the symbol header includes multiple instances a training pattern that is also stored locally by the receiver.

FIG. 6 illustrates a received OFDM frame 600 that is configured to be received and decoded by the receiver subsystem 500. The OFDM frame 600 includes a symbol header 610 and a symbol payload 620. The symbol header 610 includes CFE training patterns 630 and a synchronization pattern 640. In various embodiments the synchronization pattern 640 is time-domain modulated, while the training patterns 630 may be either time-domain modulated or frequency-domain modulated. The training patterns 630 may each have a length L=M×N as previously described.

The receiver subsystem 500 is configured to perform cross-correlation of the synchronization pattern 640 with a locally stored model pattern to quickly and efficiently synchronize to the symbol payload 620. In one aspect these improvements are enabled by this separation of the frequency estimation function and the symbol synchronization function via the modules 520*a* and 530*a*. In another aspect the separation of the frequency estimation and symbol synchronization functions enables the determination of the CFO with a larger range than, e.g. the receiver system 200.

The symbol header 610 may include any number of training patterns 630. In some embodiments the number of training patterns 630 is at least two. While not limited to any maximum number of training patterns, practical considerations such as desired transmission data rate may impose a limit on the number used. In some embodiments 64 training patterns may be used to provide acceptable noise separation between data channels.

Referring back to FIG. 5, the frequency estimation module 520*a* parses the symbol header 610 to recover the training patterns 630. Assuming that the OFDM symbol comprises M sub-blocks, the maximum frequency that may be estimated is M times the OFDM subcarrier bandwidth. The frequency estimation module 520*a* in one embodiment implements a frequency estimation function by computing a cross-correlation value as described by Eq. 4, and computing the CFO using Eq. 3 previously described.

$$P(d) = \sum_{m=0}^{M-1} \sum_{l=0}^{N-1} (r^*(d+l+(m-L)N) \cdot r(d+l+mN)) \quad (4)$$

FIG. 7 illustrates a computational model 700 that implements Eq. 4. In this approach the methodology operates using a block process. In the block process an autocorrelation value associated with the training patterns 630 of a particular OFDM frame 600 may be produced once per clock cycle. In some embodiments the accuracy of the estimate is improved by summing the block-processed autocorrelation over multiple training patterns as provided in one embodiment by the training patterns 630 in FIG. 6. In some such embodiments, the model 700 may be implemented with only 64 complex multipliers and 64 complex adders for the case of 64 training patterns. In contrast, some conventional frequency estimation methods would require 127 complex multipliers and 64*64 complex adders. Thus the model 700 may be implemented with significantly less hardware than some alternate embodiments.

Only one instance of P(d) is observed in this case compared to the computational model 400, so d cannot in general be identified in this method. However, the index i can be still identified by the value of this index that corresponds to a peak in amplitude of P(d). The carrier frequency offset can then be computed based on the phase of P(d) at its amplitude peak. In various embodiments the symbol synchronization module 530*a*, described in greater detail below, determines d.

Referring again to FIG. 5, the symbol synchronization module 530*a* performs symbol synchronization by using the synchronization patterns 640 to determine a cross-correlation value of the training patterns 630 with the locally stored model pattern. The local pattern may be stored, e.g. in a nonvolatile memory 535. The synchronization patterns 640 and the stored pattern may be arbitrary. In some embodiments the patterns are a pseudo-random bit sequence (PRBS) of ±1. In some embodiments the mark density is constrained to be about 50% to limit the generation of an offset voltage in the receiver. The length of the patterns is not limited to any particular value, but may be shorter than maximum space available. For example, some OFDM implementations may provide a symbol length of 144 samples, of which the synchronization pattern 640 may occupy only 48 samples. In some cases a greater length may be beneficial in some situations, such as a noisy signal environment.

The symbol synchronization module 530a in one embodiment implements a synchronization function described by Eqs. 4 and 5.

$$d_{pk} = \max(P(d), d = 1, 2, \ldots N) \quad (4)$$

$$P(d) = \sum_{l=1}^{L_s} r^*(d+l-1) \cdot s(l) \quad (5)$$

where in addition to the indexes described previously, $L_s$ denotes the length of the synchronization pattern and s(l) indicates the synchronization pattern value at index l.

Figure 8A:
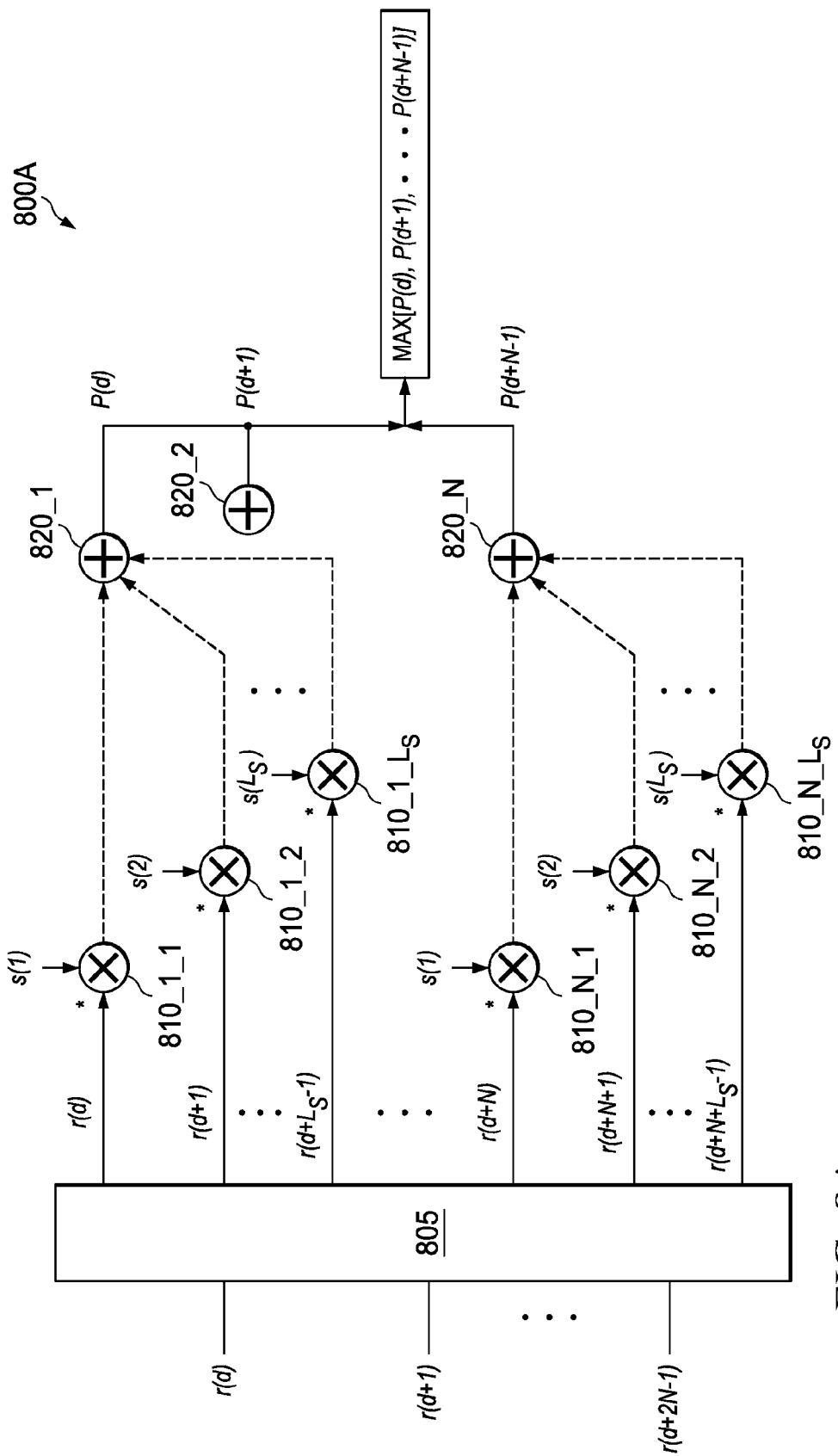
FIGS. 8A-8C illustrates computational models that may be used by the receiver of FIG. 5 to determine a cross-correlation value between a received training pattern and a locally stored training pattern.

FIG. 8A illustrates a first computational model 800A that implements Eqs. 4 and 5. The indexed bits of the received value of r are distributed by a distribution network 805 to complex multipliers 810_1_1, 810_1_2, ... 810_N_$L_s$-1, 810_N_$L_s$. Values of r having a common index d are grouped, with each value being multiplied by an equivalent bit of the synchronization pattern s. The outputs of a grouped set of multipliers 810 associated with one value of the index d, e.g. the multipliers 810_1, are provided to a complex adder 820, e.g. an adder 820_1. The output of each adder 820 is a candidate value P of the model 800A. The maximum of the P values is selected as the output d of the function 800A (see Eq. 4).

Figure 8B:
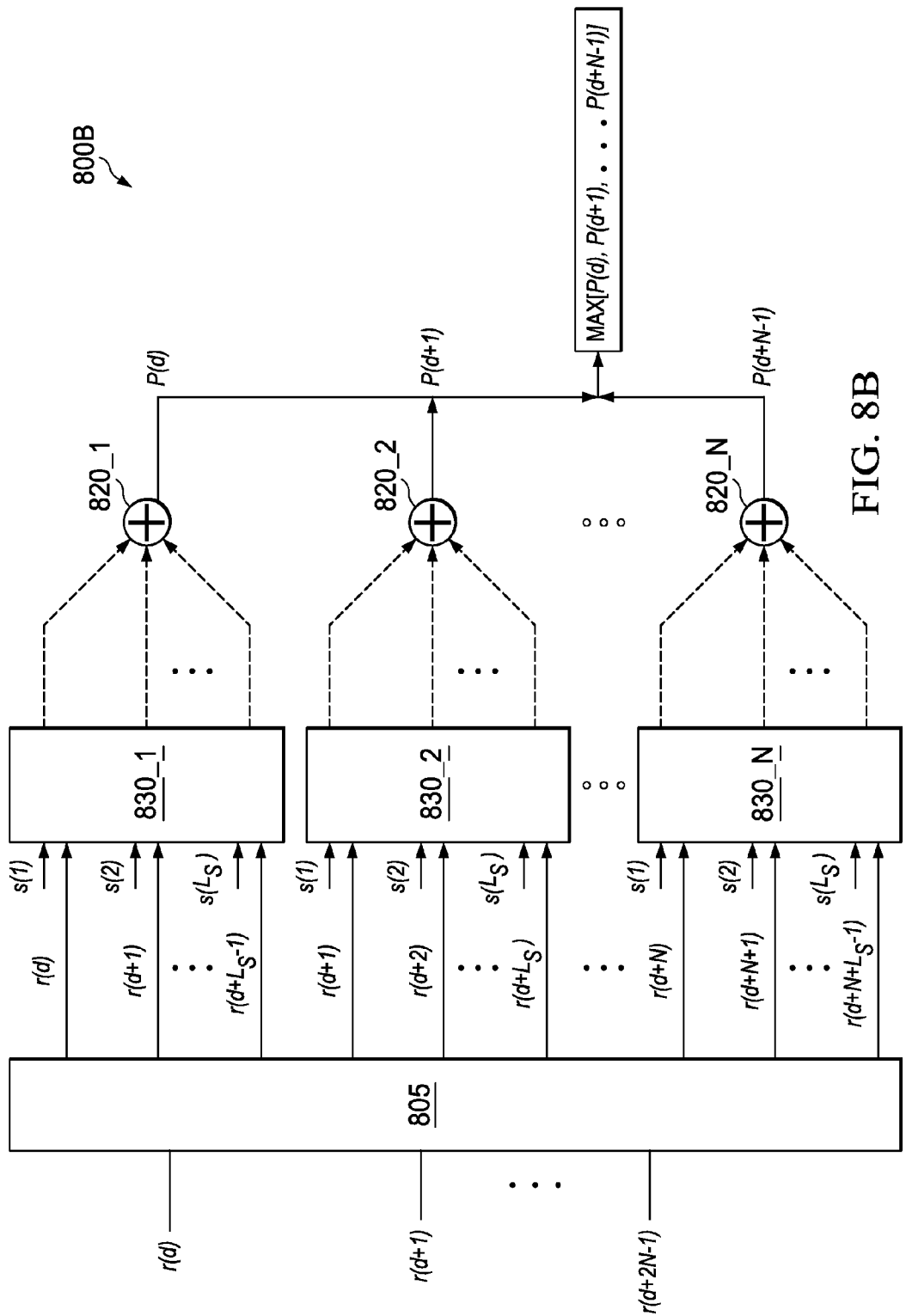

FIG. 8B illustrates a second computational model 800B that implements Eqs. 4 and 5 for the case that the synchronization pattern s consists of a sequence of only +1 or −1. In this embodiment the multipliers 810 may be replaced by logic 830 that implements the correlation using, e.g. multiplexers and adders, but without the complex multipliers 810.

Figure 8C:
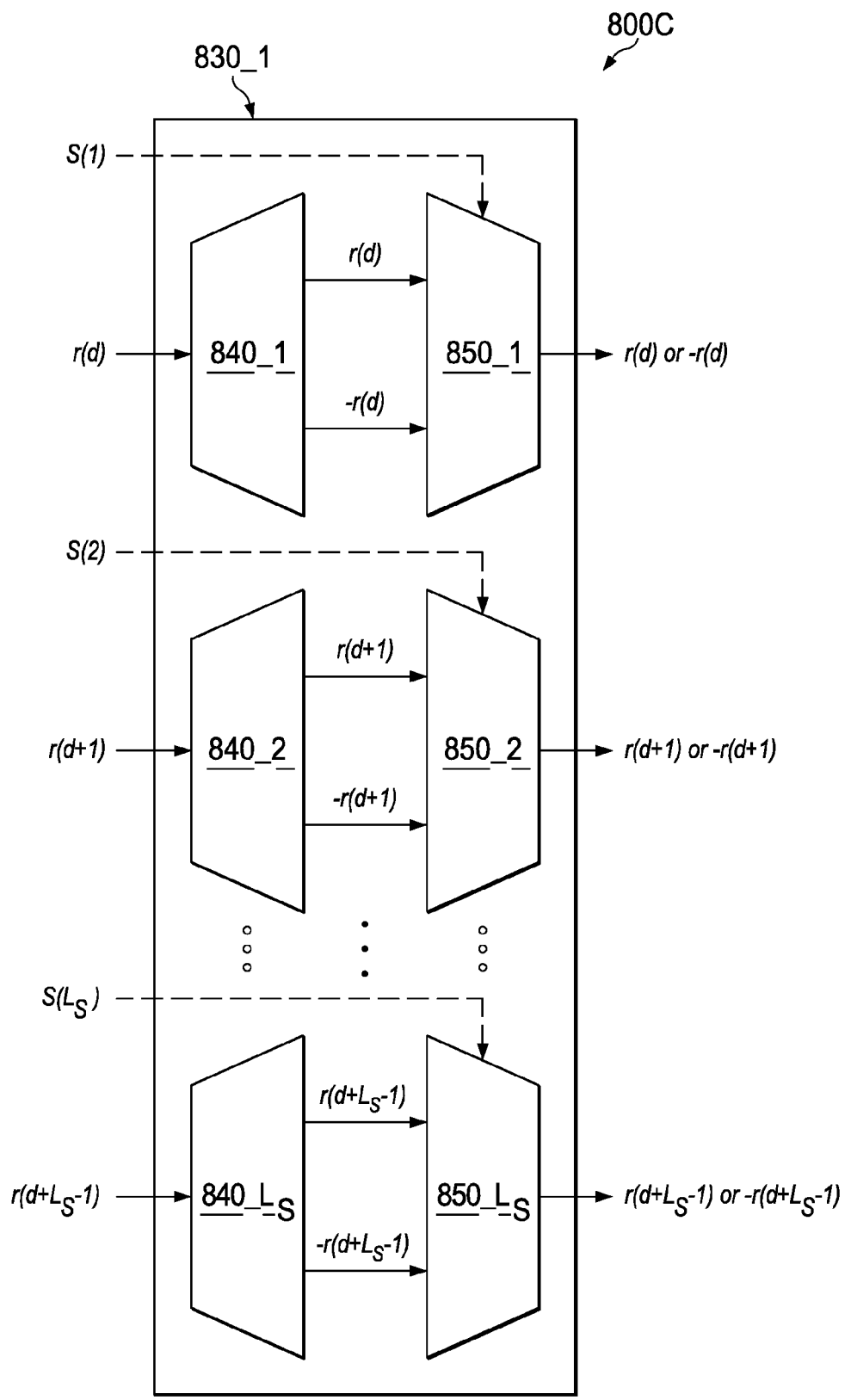

One illustrative embodiment of a portion of the logic 830 is shown in FIG. 8C, in which data splitters 840_1, 840_2, ... 840_$L_s$ and multiplexers 850_1, 850_2, ... 850_$L_s$ are shown. The multiplexers 850 each receive at first and second inputs respective first and second outputs from the corresponding data splitter 840. The data splitter 840_1 receives the subpattern r(d), which is generally complex, and splits the data into two paths. The data splitter 840_1 outputs r(d) unchanged at one output and a negated r(d) at the other output. The multiplexer 850_1 receives s(1) at a selector input. The +1 and −1 bit values of the received synchronization pattern s may be converted to respective logical values of 1 (TRUE) and 0 (FALSE). Thus the multiplexer 850_1 may be configured to select r(d) when s(1) is TRUE and to select −r(d) when s(1) is FALSE, and to present the selected value at its output. Similar logic associated with r(d+1) ... r(d+$L_s$−1) selects unchanged or negated values of these quantities.

Referring to FIG. 8B, the adder 820 receives the selected values of ±r(d) from the multiplexers 850 and performs a complex summation. The output of the adder 820_1 is P(d). P(d+1), P(d+2), ... P(d+N−1) are similarly computed. The maximum value P(d+i) and index i of P(d), P(d), ... P(d+N−1) are determined and reported as the correlation value.

When implemented in the described manner the computational model 800B may be efficiently implemented in programmable logic, thereby significantly simplifying the hardware required to implement the model 800B as compared to the model 800A.

The simplification of the autocorrelation function enables the use of programmable logic devices to realize the front-end sub-processor 203 or 505 and the MIMO demodulation sub-processor 204. Accordingly, referring to FIG. 5, in some embodiments the frequency estimation module 520a, symbol synchronization module 530a and the parallel FFT module 250a are implemented on a first programmable logic device 540, and the frequency estimation module 520b, symbol synchronization module 530b and the parallel FFT module 250b are implemented on a second programmable logic device 550. The demodulation subprocessor 204 may be implemented on a third programmable logic device 560. The programmable logic devices may be, e.g. FPGAs.

Conventional MIMO receiver systems are typically not well-suited to implementation on currently available programmable logic devices at high data transfer rates, e.g. approaching 100 Gb/s. Because such conventional systems typically rely on serial processing within the symbol synchronization block, their clock speeds typically exceed the maximum clock frequency supported by programmable logic devices, e.g. about 500 MHz. However, because the symbol synchronization modules 530a and 530b perform symbol synchronization using the reduced-complexity computational models as described above, the programmable logic devices 540 and 550 may operate at or below typical programmable logic device maximum operating frequency, e.g. ≤500 MHz. Thus, unlike known conventional OFDM receiver implementations, the receiver subsystem 200 and/or the subsystem 500 may be implemented on programmable logic devices to operate to receive an optical signal that is OFDM modulated with a bit rate of at least about 100 Gb/s.

The ability to implement the receiver subsystems 200 and 500 using FPGAs may provide significant advantages over alternative implementations. FPGAs may, for instance, provide lower development cost, rapid design turnaround, and flexibility compared to alternatives such as ASICs. However, such advantages are not to be construed as limiting the scope of the disclosure to implementations using FPGAs. Indeed, embodiments of the disclosure include any hardware implementation that conforms to the principles disclosed herein.

Figure 9:
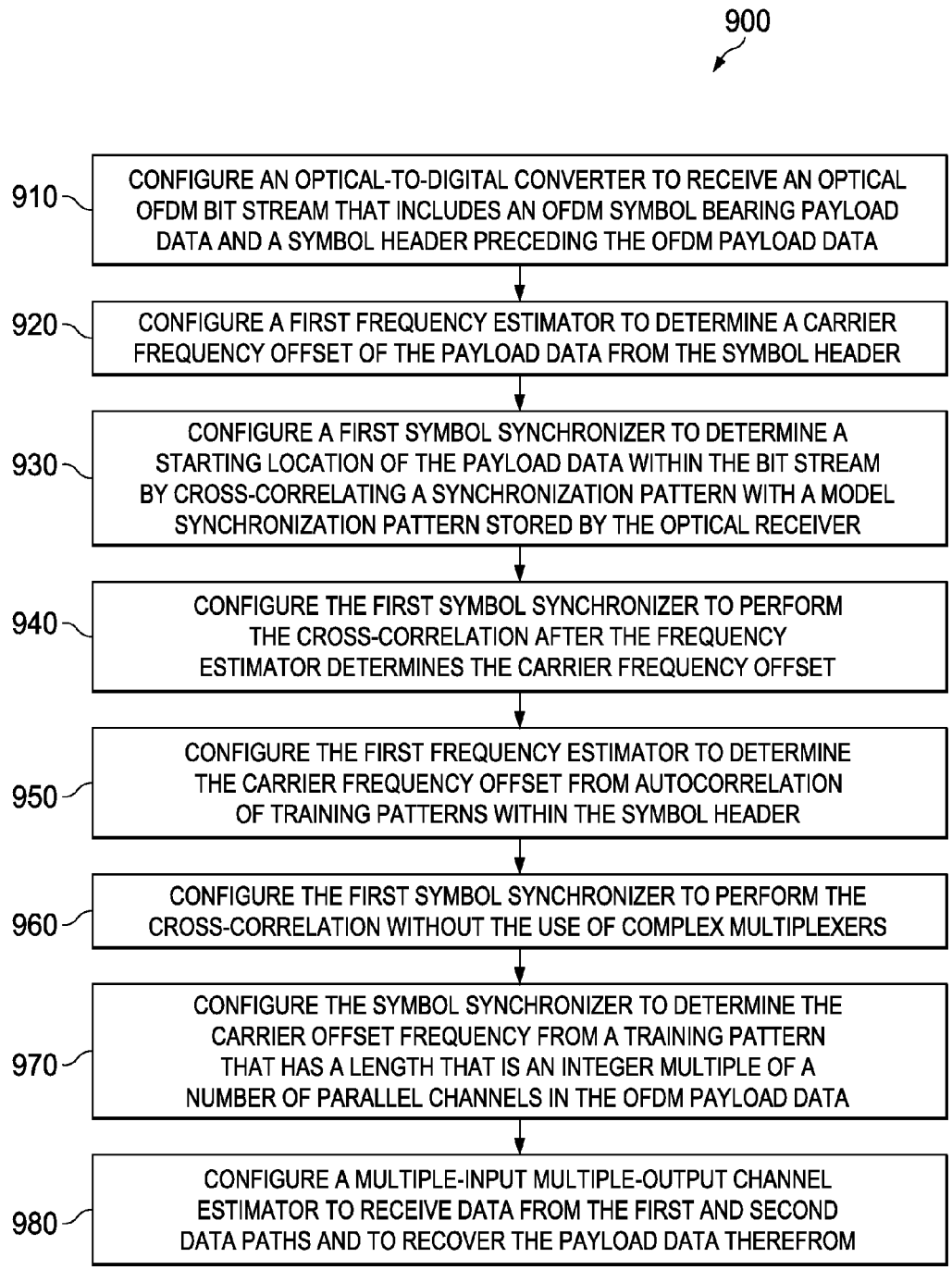
FIG. 9 presents a method, e.g. for forming an optical communication system such as the system of FIG. 1.

Turning to FIG. 9, a method 900 is presented according to one embodiment of the disclosure, e.g. a method of forming an optical transmission system. The method 900 is described in some cases by reference to various features previously described herein, e.g. in FIGS. 1-8, without limitation thereto. Various embodiments of the disclosure may use some or all of the illustrated steps, and may include steps that are not illustrated. Furthermore, in some embodiments steps of the method 900 may be performed in an order other than the illustrated order.

In a step 910, an optical-to-digital converter, e.g. the ODC 201, is configured to receive an optical OFDM bit stream. The bit stream includes an OFDM symbol bearing payload data and a symbol header preceding the OFDM payload data. In a step 920 a first frequency estimator, e.g. the frequency estimation module 520a, is configured to determine a carrier frequency offset of the payload data from the symbol header. In a step 930 a first symbol synchronizer, e.g. the symbol synchronization module 530a, is configured to determine a starting location of the payload data within the bit stream by cross-correlating a synchronization pattern with a model synchronization pattern stored by the optical receiver.

In a step 940 the symbol synchronizer is configured to perform the cross-correlation after the frequency estimator determines the carrier frequency offset.

In a step 950 the frequency estimator is configured to determine the carrier frequency offset from autocorrelation of training patterns within the symbol header.

In a step 960 the first symbol synchronizer is configured to perform the cross-correlation without the use of complex multiplexers.

In a step 970 the symbol synchronizer is configured to determine the carrier offset frequency from a training pattern that has a length that is an integer multiple of a number of parallel channels in the OFDM payload data.

In step 980 a MIMO channel estimator, e.g. the channel estimation module 275, is configured to receive data from the first and second data paths and to recover the payload data therefrom.

Those skilled in the art to which this application relates will appreciate that other and further additions, deletions, substitutions and modifications may be made to the described embodiments.

What is claimed is:

1. An optical communication system, comprising:
an optical receiver configured to receive an optical OFDM bit stream including an OFDM symbol bearing payload data and a symbol header preceding said OFDM payload data;
a first frequency estimator configured to determine a carrier frequency offset of said payload data from said symbol header; and
a first symbol synchronizer configured to determine a starting location of said payload data within said bit stream by cross-correlating a synchronization pattern within said symbol header with a model synchronization pattern stored by said optical receiver;
wherein a first data path comprises said first frequency estimator and said first symbol synchronizer, and a second data path that operates in parallel with said first data path comprises a second frequency estimator and a second symbol synchronizer.

2. The system as recited in claim 1, wherein said symbol synchronizer performs said cross-correlation after said frequency estimator determines said carrier frequency offset.

3. The system as recited in claim 1, wherein said frequency estimator determines said carrier frequency offset from autocorrelation of training patterns within said symbol header.

4. The system as recited in claim 1, wherein said first symbol synchronizer is configured to perform said cross-correlation without the use of complex multipliers.

5. The system as recited in claim 1, wherein said symbol synchronizer determines said carrier frequency offset from a training pattern that has a length that is an integer multiple of a number of parallel channels in said OFDM payload data.

6. The system as recited in claim 1, further comprising a multiple-input multiple-output channel estimator configured to receive data from said first and second data paths and to recover said payload data therefrom.

7. An optical communication system, comprising:
an optical transmitter configured to transmit an optical OFDM bit stream, said bit stream including:
an OFDM symbol bearing payload data; and
a symbol header preceding said OFDM payload data, said symbol header including at least two training patterns, each training pattern having a length that is an integer multiple of a number of parallel data processing channels in said OFDM payload data; and
an optical receiver configured to receive said optical OFDM bit stream, said receiver including;
a first frequency estimator configured to determine a carrier frequency offset of said payload data from said symbol header; and
a first symbol synchronizer configured to determine a starting location of said payload data within said bit stream by cross-correlating a synchronization pattern within said symbol header with a model synchronization pattern stored by said optical receiver;
wherein a first data path comprises said first frequency estimator and said first symbol synchronizer, and a second data path that operates in parallel with said first data path comprises a second frequency estimator and a second symbol synchronizer.

8. The system as recited in claim 7, wherein said frequency estimator determines said carrier frequency offset from autocorrelation of said at least two training patterns.

9. The system as recited in claim 7, wherein said symbol synchronizer determines an autocorrelation value after said frequency estimator determines said carrier frequency offset.

10. A method, comprising:
configuring an optical-to-digital converter to receive an optical OFDM bit stream including an OFDM symbol bearing payload data and a symbol header preceding said OFDM payload data;
configuring a first frequency estimator to determine a carrier frequency offset of said payload data from said symbol header;
configuring a first symbol synchronizer to determine a starting location of said payload data within said bit stream by cross-correlating a synchronization pattern with a model synchronization pattern stored by said optical-to-digital converter, wherein a first data path comprises said first frequency estimator and said first symbol synchronizer; and
configuring a second frequency estimator and a second symbol synchronizer to operate in a second data path in parallel with said first data path.

11. The method as recited in claim 10, further comprising configuring said symbol synchronizer to perform said cross-correlation after said frequency estimator determines said carrier frequency offset.

12. The method as recited in claim 10, further comprising configuring said frequency estimator to determine said carrier frequency offset from autocorrelation of training patterns within said symbol header.

13. The method as recited in claim 10, further comprising configuring said first symbol synchronizer to perform said cross-correlation without the use of complex multipliers.

14. The method as recited in claim 10, further comprising configuring said symbol synchronizer to determine said carrier offset frequency from a training pattern that has a length that is an integer multiple of a number of parallel channels in said OFDM payload data.

15. The method as recited in claim 10, further comprising configuring a multiple-input multiple-output channel estimator to receive data from said first and second data paths and to recover said payload data therefrom.

16. An optical orthogonal frequency-division multiplexing receiver, comprising:
an optical-to-digital converter configured to receive an optical OFDM bit stream;
a first frequency estimator and a first symbol synchronizer implemented on a first programmable logic device and configured to determine a carrier frequency offset of an orthogonal frequency-division multiplexed frame associated with a first polarization channel of said OFDM bit stream; and
a second frequency estimator and a second symbol synchronizer implemented on a second programmable logic device and configured to determine a carrier frequency offset of an orthogonal frequency-division multiplexed frame associated with a second polarization channel of said OFDM bit stream, wherein said first and second programmable logic devices are configured to operate on a OFDM bit stream having a bit rate of at least about 100 Gb/s.

17. An optical communication system, comprising:

an optical receiver configured to receive an optical OFDM bit stream including an OFDM symbol bearing payload data and a symbol header preceding said OFDM payload data;

a first frequency estimator configured to determine a carrier frequency offset of said payload data from said symbol header;

a first symbol synchronizer configured to determine a starting location of said payload data within said bit stream by cross-correlating a synchronization pattern within said symbol header with a model synchronization pattern stored by said optical receiver without the use of complex multipliers.

18. A method, comprising:

configuring an optical-to-digital converter to receive an optical OFDM bit stream including an OFDM symbol bearing payload data and a symbol header preceding said OFDM payload data;

configuring a first frequency estimator to determine a carrier frequency offset of said payload data from said symbol header;

configuring a first symbol synchronizer to determine a starting location of said payload data within said bit stream by cross-correlating a synchronization pattern with a model synchronization pattern stored by said optical-to-digital converter without the use of complex multipliers.

* * * * *